United States Patent [19]
Yokote

[11] Patent Number: 4,659,107
[45] Date of Patent: Apr. 21, 1987

[54] AUTOMATIC SEAT BELT SYSTEM

[75] Inventor: Yoshihiro Yokote, Yokohama, Japan

[73] Assignee: NSK-Warner K.K., Tokyo, Japan

[21] Appl. No.: 662,903

[22] Filed: Oct. 22, 1984

[30] Foreign Application Priority Data

Nov. 1, 1983 [JP] Japan .......................... 58-168388[U]

[51] Int. Cl.⁴ ............................................. B60R 21/02
[52] U.S. Cl. ................................................. 280/804
[58] Field of Search ........... 280/804; 191/23 R, 45 R, 191/45 A; 297/469, 473; 104/115, 123, 140

[56] References Cited
U.S. PATENT DOCUMENTS

| | | | |
|---|---|---|---|
| 3,392,244 | 7/1968 | Hillmann | 191/23 R |
| 3,889,971 | 6/1975 | Kazaoka et al. | 280/804 |
| 3,998,306 | 12/1976 | Howell | 191/23 R |
| 4,343,489 | 8/1982 | Suzuki et al. | 280/804 |
| 4,354,695 | 10/1982 | Sato | 280/804 |
| 4,437,684 | 3/1984 | Moriya et al. | 280/804 |

FOREIGN PATENT DOCUMENTS 58-52050  4/1983  Japan .

*Primary Examiner*—Richard A. Bertsch
*Attorney, Agent, or Firm*—Wegner & Bretschneider

[57] ABSTRACT

An automatic seat belt system includes a guide rail arranged along a predetermined path within the room of an automobile, a runner provided movably on the guide rail, and a drive member for causing the runner to move in such a way that a webbing fastened to the runner is displaceable between an occupant restraining position and an occupant non-restraining position. The system further comprises a plurality of brackets for mounting the guide rail on the body of the automobile and means for positioning the brackets at desired locations relative to the length of the guide rail. The automatic seat belt system of this invention allows to reduce the material and machining costs upon fabrication of its guide rail and permits easy positional registration or matching between the guide rail and its brackets upon mounting the guide rail on the body of the automobile.

7 Claims, 15 Drawing Figures

AUTOMATIC SEAT BELT SYSTEM

BACKGROUND OF THE INVENTION

This invention relates to a runner guide rail suitable for use in an automatic seat belt system, and especially to a runner guide rail enjoying low material and machining costs and permitting easy positioning.

In automatic seat belt systems, a runner 12 on which a portion of a webbing 10 is fastened is provided, as shown in FIG. 1, movably along a guide rail 14 arranged along an automobile body while being guided by the guide rail 14. The runner 12 is driven by a tape-like drive member (hereinafter called "drive tape") 30 (see, FIGS. 2 and 3) for example in association with the opening and closure of a door and is caused to move along the guide rail 14. The drive tape 30 is provided with projections or holes whereas a disk 20 fixedly mounted on the motor shaft of a motor 19 is provided with recesses or projections. Owing to progressive engagement of the projections or holes of the drive tape 30 with the recesses or projections of the disk 20, the drive tape 30 is caused to move along the length thereof and the runner 12 is thus allowed to move along the guide rail 14. Therefore, the webbing 10 is displaced between an occupant restraining position and an occupant non-restraining position.

Since the drive tape 30 extends not only through the guide rail 14 but also through the space between the guide rail 14 and motor 19, guide channels 22 are formed for the drive tape 30 in the guide rail 14 as depicted in FIG. 2 and at the same time, a guide tube 18 is provided in the space so as to guide the drive tape 30 through its guide space 26 as illustrated in FIG. 3. When guiding the guide tape 30 by a guide member such as the guide rail 14 or guide tube 18, the guide member is required to have the following mutually-contradictory two functions.

Firstly, a compression force is exerted to the drive tape 30 upon driving the runner 12. Thus, the drive tape 30 is susceptible of developing a wavy deformation in a direction perpendicular to the length of the drive tape 30 (in other words, in the thicknesswise direction of the drive tape 30). When such a deformation has been developed, the both surfaces of the drive tape 30 are brought into contact with the guide rail 14 and guide tube 18. Due to frictional contact between the drive tape 30 and the guide rail 14 and guide tube 18, the smooth movement of the drive tape 30 is thus impaired in the guide rail 14 and guide tube 18. In order to avoid such a problem, it is necessary to make the height $T_1$ of guide channels 22 of the guide rail 14 or the height $T_2$ of a guide space 26 of the guide tube 18 closer to the thickness t of the drive tape 30 as much as possible, respectively as shown in FIG. 2 or FIG. 3. However, this will develop a new problem.

The above-mentioned new problem is caused by the fact that when arranging the guide tube 18 and guide rail 14 along the automobile body, they do no assume their positions within the same plane. Namely, when guiding the drive tape 30 by a portion 32 of the guide tube 18 which portion is bent in the widthwise direction of the drive tape 30, the drive tape 30 is wriggled or twisted locally as indicated by a two-dot chain line in FIG. 3. When the thus-wriggled drive tape 30 passes through the narrow guide space 26 having a height $T_2$, the sliding resistance of the drive tape 30 increases considerably due to a friction between the guide tube 18 and the drive tape 30. Similar phenomenon can also be observed with the guide rail 14. When the drive tape 30 passes by a portion 36 of the guide rail 14 which portion is bent in the widthwise direction of the drive tape 30, the drive tape 30 is wriggled and its sliding resistance increases with respect to the guide rail 14. In order to permit the wriggling of the drive tape 30 in the guide tube 18 or guide rail 14, it is desirous to broaden the heights $T_2$, $T_1$ of the guide space 26 and guide channels 22. This desire is however contradictory to the above requirement.

In the meantime, it was found that the above demand may be satisfied by forming a drive tape guide member, which includes the guide rail, into a substantially rectangular shape in cross-section and providing inwardly-extending ridges along the longitudinal central axes of the wider walls of the drive tape guide member.

As shown in FIG. 5, a guide tube 40 is formed of a substantially rectangular cylindrical member. The longitudinal central part of the guide tube 40 is squeezed inwardly, namely, in the direction of its height, thereby reducing the height there. One of the inwardly-squeezed portions defines a flat section 44, which is parallel to the lower walls 42 of the guide tube 40, and tilted sections 46 extending at both sides of the flat section 44. The other inwardly-squeezed portion defines an arcuate section 48. The distance $T_3$ between the flat section 44 and the arcuate section 48 is set somewhat greater than the thickness t of the drive tape 30, while the width of the flat section 44 and the curvature of the arcuate section 48 are set at such levels that they would not impair the turning motion of the drive tape 30 approximately about the longitudinal central axis of the guide tube 18.

Reference is next made to FIG. 6, in which drive tape guide channels 62 having a substantially trapezoidal cross-section are formed through a guide rail 60 (a central portion of its rectangular cross-section has been removed for the guidance of the runner). As shown in detail on an enlarged scale in FIG. 7, each of the guide channels 62 defines, in its upper and lower walls, flat sections 64,64 which outwardly terminate in tilted sections 66,66. Therefore, the height of each of the guide channels 62 increases gradually toward its outward extremity. The height (interval) $T_4$ between the flat sections 64,64 is somewhat greater than the thickness t of the drive tape 30. On the other hand, the widths of the flat sections 64,64 and the inclinations of the tilted sections 66,66 are set at such levels that they permit the turning motion of the drive tape 30 about longitudinal central axis between the guide channels 62,62. Although not shown in FIG. 6, the runner 12 is received in the spacing 63 formed underneath the guide channels 62,62.

Owing to the above-described structure, there is no danger that the drive tape 30 would develop wavy deformations even when the motor 18 is turned on to feed the drive tape 30 upward and forward so as to have the webbing 10 assume the occupant restraining position (which is shown by the two-dot chain line in FIG. 1), because the drive tape 30 is guided by the flat section 44 and arcuate section 48 of the guide tube 40 and the flat sections 64,64 of the guide rail 60. In addition, the drive tape 30 is allowed to undergo wriggling in the bent portions 32,36 owing to the provision of spaces 52 and 68 respectively in the guide tube 40 and guide rail 60. Thus, the sliding resistances of the guide tape 30 to the guide tube 40 and guide rail 60 are kept low, thereby allowing the drive tape 30 to move smoothly to drive the runner 12 forward.

By the way, it is not necessary to limit the shape of the squeezed portion of the guide tube 40 to the above-described exemplary shape. For example, both upper and lower walls may be squeezed inward to define arcuate sections 54,54 as shown in FIG. 8. Each of the upper and lower walls may be squeezed to form a flat section 56 and tilted sections 58,58 as depicted in FIG. 9. Alternatively, inwardly-extending ridges 59,59 of rectangular cross-sections may be formed respectively on the upper and lower walls as shown in FIG. 10.

As has been described above, the guide rail or guide tube of an automatic seat belt system is fixedly attached to the body of an automobile. The attachment of the guide rail to the automobile body has conventionally been effected as illustrated in FIG. 11, namely, by forming a longitudinally-extending flange 72 along one side of a guide rail 70 and then cutting off the flange 72 except for some portions at which the guide rail 70 is attached to the automobile body 72 by means of threaded members 74. This removal of the flange 72 is required because if the flange 72 should extend along the entire length of the guide rail 70, the flange 72 interferes the automobile body or hinders the bending machining of the guide rail 70. The guide rail 70 is usually fabricated by the extrusion of aluminum. It is tremendously wasteful to provide the flange 72 along the entire length of the guide rail 70 upon its forming. After the forming, the thus-provided flange 72 is cut off except for portions adapted to attach the guide rail 70 to the automobile body 76. This cutting work however results in need for an additional labor cost.

Besides, it has also been practiced to fix a guide rail 80 on the automobile body 76 by means of brackets 82 as depicted in FIG. 12. Since a plurality of brackets 82 having a predetermined length are used in the above fixing method, the drawback of the above-described prior art fixing method has been overcome. However, this fixing method is accompanied by another drawback that the positioning between the guide rail 80 and brackets 82 is difficult.

SUMMARY OF THE INVENTION

An object of this invention is to solve the drawbacks of the prior art fixing methods of guide rails, namely, to provide an automatic seat belt system equipped with a guide rail which enjoys low material and machining costs and permits easy positioning upon its mounting.

In one aspect of this invention, there is thus provided an automatic seat belt system including a guide rail arranged along a predetermined path within the room of an automobile, a runner provided movably on the guide rail, and a drive member for causing the runner to move in such a way that a webbing fastened to the runner is displaceable between an occupant restraining position and an occupant non-restraining position, which system further comprises:

a plurality of brackets for mounting the guide rail on the body of the automobile; and means for positioning the brackets at desired locations relative to the length of the guide rail.

The automatic seat belt system of this invention allows to reduce the material and machining costs upon fabrication of its guide rail and permits easy positional registration or matching between the guide rail and its brackets.

The above and other objects, features and advantages of the present invention will become apparent from the following description and the appended claims, taken in conjunction with the accompanying drawings.

BRIEF DESCRIPTION OF THE THE DRAWINGS

DETAILED DESCRIPTION OF THE INVENTION AND PREFERRED EMBODIMENT

Figure 1:
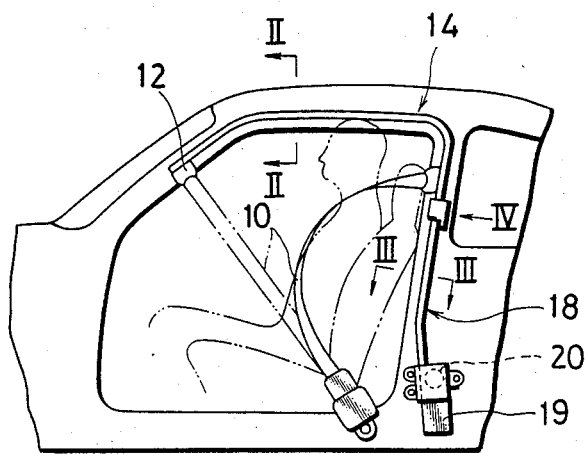
FIG. 1 is a simplified schematic overall illustration of one example of automatic seat belt systems, to which this invention may be applied.
Figure 2:
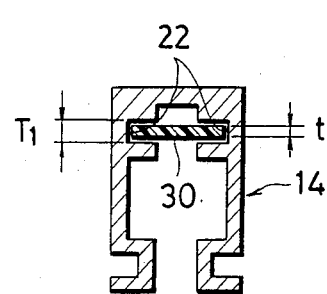
FIG. 2 is a cross-sectional view taken along line II—II of FIG. 1.
Figure 3:
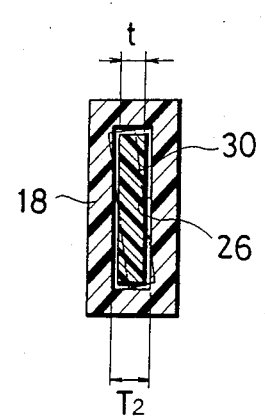
FIG. 3 is a cross-sectional view taken along line III—III of FIG. 1.
Figure 4:
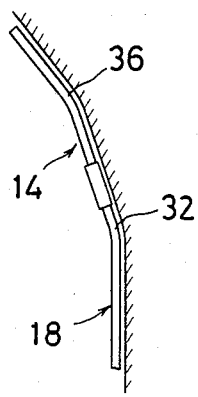
FIG. 4 is a fragmentary view seen in the direction of an arrow IV in FIG. 4.
Figure 5:
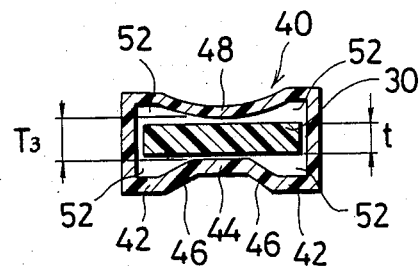
FIG. 5 is a transverse cross-sectional view of an improved guide tube.
Figure 6:
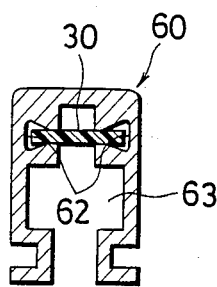
FIG. 6 is a transverse cross-sectional view of an improved guide rail.
Figure 7:
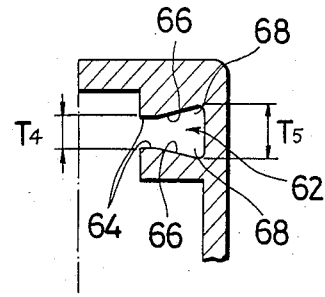
FIG. 7 is an enlarged fragmentary view of the improved guide rail of FIG. 6.
Figure 8:
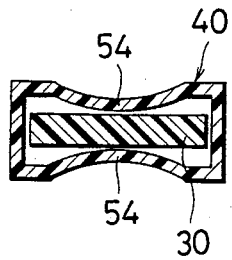
FIG. 8 is a transverse cross-sectional view of a modification of the improved guide tube of FIG. 5.
Figure 9:
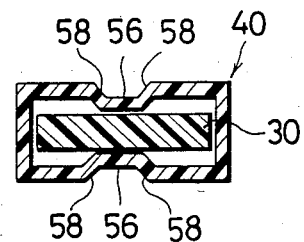
FIG. 9 is a transverse cross-sectional view of another modification of the improved guide tube of FIG. 5.
Figure 10:
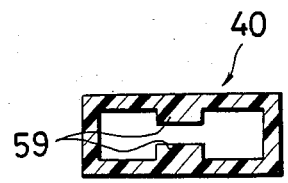
FIG. 10 is a transverse cross-sectional view of a further modification of the improved guide tube of FIG. 5.
Figure 11:
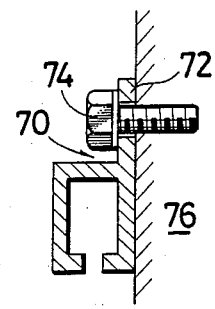
FIG. 11 is a cross-sectional view showing an attachment portion of a conventional guide rail to an automobile body.
Figure 12:
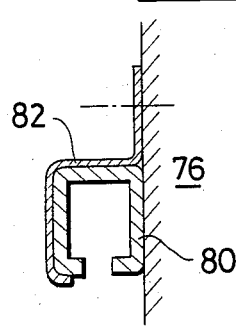
FIG. 12 is a cross-sectional view showing an attachment portion of another conventional guide rail to an automobile body.
Figure 13:
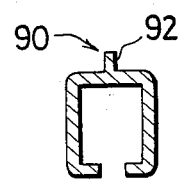
FIG. 13 is a cross-sectional view of a guide rail according to one embodiment of this invention, which guide rail has overcome the problems of the conventional guide rails of FIGS. 11 and 12.
Figure 14:
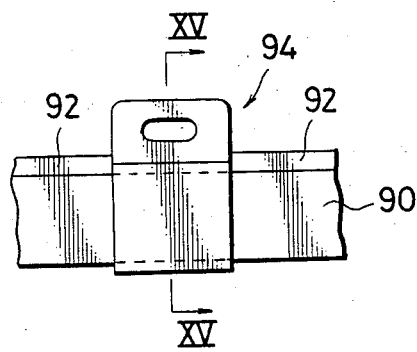
FIG. 14 is a front view showing the manner of fixing of the guide rail of FIG. 13 by means of a bracket.
Figure 15:
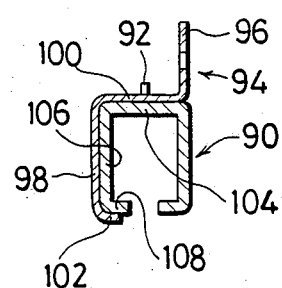
FIG. 15 is a cross-sectional view taken along line XV—XV.

As illustrated in FIGS. 13-15, a short rib 92 is formed over the entire length of the upper wall of the guide rail 90 with a height and width not impairing the bending of the guide rail 90. Its material cost can be saved when the thickness of the rib 92 is rendered thinner than the wall thickness of the guide rail 90. The rib 92 is then cut off at portions where the guide rail 90 will subsequently be supported by brackets 94. As shown in FIGS. 14 and 15, the brackets 94 are then inserted in the cut-off portions of the rib 92. As best seen in FIG. 15, the bracket 94 is composed of an upper upright portion 96, a lower upright portion 98, a horizontal portion 100 connecting the lower extremity of the upper upright portion 96 and the upper extremity of the lower upright portion 98 together, and a flange 102 extending outwardly from the lower extremity of the lower upright portion 98. The horizontal portion 100 extends over the upper surface of an upper wall 104 of the guide rail 90, while the lower upright portion 98 lies over the inner upright wall 106 of the guide rail 90. On the other hand, the flange 102 lies over an outwardly-bent portion 108 of the guide rail 90. Accordingly, the vertical position of the bracket 94 is set relative to the guide rail 90 by the horizontal portion 100 and flange 102. In this manner, the rib 92 is short and thin. Thus, it does not impair the bending of the guide rail 90 and its material cost can be reduced. Furthermore, the above structure permits extremely easy positional registration or matching between the guide rail 90 and brackets 94.

The description has been made with reference to the mounting of the guide rail. It should however be borne in min that the guide tube may also be mounted in the same manner.

The guide tube 40 and guide rail 60 have been referred to as guide members for the drive tape 30. It is howeve not essential to include both guide tube 40 and guide rail 60 as described above. The automatic seat belt system may operate successfully so long as the drive tape 30 is guided in the above-described manner by either one of the guide tube 40 and guide rail 60.

Having now fully described the invention, it will be apparent to one of ordinary skill in the art that many changes and modifications can be made thereto without departing from the spirit or scope of the invention as set forth herein.

What is claimed is:

1. An automatic seat belt system including a guide rail arranged along a predetermined path within the room of an automobile, a runner provided movably on the guide rail, and a drive member for causing the runner to move in such a way that a webbing fastened to the runner is displaceable between an occupant restraining position and an occupant-non-restraining position, the system further comprising:
   a plurality of brackets provided in contact with the outer wall of the guide rail;
   means for securing the brackets on the body of the automobile; and
   means for positioning the brackets at desired locations relative to the length of the guide rail, said positioning means comprising a rib formed on the outer wall of the guide rail and extending along the length of the guide rail, and cut-off portions formed in the rib from the longitudinal free edge of the rib toward the guide rail and defining indentations in which the brackets are partly received.

2. An automatic seat belt system as claimed in claim 1, wherein the width of each of the cut-off portions is substantially equal to the width of its corresponding bracket.

3. An automatic seat belt system as claimed in claim 1, wherein the thickness of the rib is thinner than the wall thickness of the guide rail.

4. An automatic seat belt system as claimed in claim 1, further comprising means for positioning each of the brackets vertically relative to the guide rail.

5. An automatic seat belt system including a guide rail arranged along a predetermined path within the room of an automobile, a runner provided movably on the guide rail, and a drive member for causing the runner to move in such a way that a webbing fastened to the runner is displaceable between an occupant restraining position and an occupant-non-restraining position, the system further comprising:
   a plurality of brackets for mounting the guide rail on the body of the automobile;
   means for positioning the brackets are desired locations relative to the length of the guide rail; and
   wherein the guide rail has an inverted square U-shaped transverse cross-section with both free end portions thereof bent at right angles inwardly with a gap left therebetween, and wherein the positioning means comprising a rib formed along the length of the guide rail and cut-off portions formed in the rib, said rib extending upright from substantially the transverse central point of the top side of the inverted square U-shaped transverse cross-section.

6. An automatic seat belt system as claimed in claim 5, wherein each bracket has a upper upright portion, a lower upright portion and a central horizontal portion connecting the lower extremity of the upper upright portion and the upper extremity of the lower upright portion together, and when mounted on the automobile, the upper upright portion lies over the automobile body, the central horizontal portion extends over the upper wall of the guide rail and the lower upright portion lies over the inner upright wall of the guide rail.

7. An automatic seat belt system as claimed in claim 6, wherein each bracket further comprises a flange, which extends outwardly from the lower extremity of the lower upright portion so that the flange lies over the thus-bent inner free end portion of the guide rail when seen in a transverse cross-section.

* * * * *